United States Patent
Hirose (10) Patent No.: US 8,958,446 B2
(45) Date of Patent: Feb. 17, 2015

(54) METHOD FOR DETERMINING STABILIZATION OF LIGHT OUTPUT SIGNAL AND LASER FREQUENCY STABILIZING DEVICE

(75) Inventor: Koichi Hirose, Utsunomiya (JP)

(73) Assignee: Mitutoyo Corporation, Kanagawa (JP)

( * ) Notice: Subject to any disclaimer, the term of this patent is extended or adjusted under 35 U.S.C. 154(b) by 152 days.

(21) Appl. No.: 13/611,952

(22) Filed: Sep. 12, 2012

(65) Prior Publication Data

US 2013/0077644 A1      Mar. 28, 2013

(30) Foreign Application Priority Data

Sep. 28, 2011   (JP) ................. 2011-212594

(51) Int. Cl.
*H01S 3/13*       (2006.01)
*H01S 3/139*      (2006.01)
*H01S 3/0941*     (2006.01)
*H01S 3/109*      (2006.01)
*H01S 3/16*       (2006.01)

(52) U.S. Cl.
CPC ............. *H01S 3/1398* (2013.01); *H01S 3/1392* (2013.01); *H01S 3/09415* (2013.01); *H01S 3/109* (2013.01); *H01S 3/1611* (2013.01); *H01S 3/1673* (2013.01); *H01S 2301/02* (2013.01)
USPC ........................................ 372/29.02; 372/32

(58) Field of Classification Search
CPC . H01S 3/1398; H01S 3/1392; H01S 3/09415; H01S 3/109; H01S 2301/02; H01S 3/1611; H01S 3/1673
USPC ............................................... 372/29.02, 32
See application file for complete search history.

(56) References Cited

U.S. PATENT DOCUMENTS

| | | |
|---|---|---|
| 5,068,864 A | 11/1991 | Javan |
| 5,224,110 A | 6/1993 | Hudson |
| 5,450,207 A | 9/1995 | Fomenkov |

(Continued)

FOREIGN PATENT DOCUMENTS

| | | |
|---|---|---|
| EP | 1744414 | 1/2007 |
| EP | 1930998 | 6/2008 |

(Continued)

OTHER PUBLICATIONS

Extended European Search Report, mailed Mar. 1, 2013, from the European Patent Office (E.P.O.) for Application No. 12006047.

*Primary Examiner* — Yuanda Zhang
(74) *Attorney, Agent, or Firm* — Greenblum & Bernstein, P.L.C.

(57) ABSTRACT

A method for determining stabilization of a light output signal employed by a laser frequency stabilizing device which irradiates laser light on an absorption cell to obtain the light output signal and, based on a saturated absorption line contained in the light output signal, changes a resonator length to stabilize an oscillation frequency of the laser light to a specific saturated absorption line. The laser frequency stabilizing device includes a conversion mechanism converting the laser light that passes through the absorption cell into the light output signal, an actuator changing the resonator length, and a control mechanism controlling operation of the actuator. The method for determining stabilization includes a signal analysis step analyzing the light output signal and a stabilization determination step determining whether the light output signal is stabilized based on an analysis result from the signal analysis step, executed by the control mechanism.

20 Claims, 6 Drawing Sheets

(56) References Cited

U.S. PATENT DOCUMENTS

| | | |
|---|---|---|
| 7,233,608 B2 | 6/2007 | Zemmouri et al. |
| 7,613,216 B2 | 11/2009 | Nakagawa |
| 7,835,411 B2 | 11/2010 | Masuda et al. |
| 2007/0008995 A1 | 1/2007 | Oozeki et al. |
| 2008/0130694 A1 | 6/2008 | Nakagawa |
| 2009/0232172 A1 | 9/2009 | Masuda et al. |

FOREIGN PATENT DOCUMENTS

| | | |
|---|---|---|
| EP | 2101378 | 9/2009 |
| FR | 2826191 | 12/2002 |
| JP | 2000-261092 | 9/2000 |
| JP | 2008-141054 | 6/2008 |

Related art

Fig. 5B

Related art

Fig. 6

METHOD FOR DETERMINING STABILIZATION OF LIGHT OUTPUT SIGNAL AND LASER FREQUENCY STABILIZING DEVICE

CROSS-REFERENCE TO RELATED APPLICATIONS

The present application claims priority under 35 U.S.C. §119 of Japanese Application No. 2011-212594, filed on Sep. 28, 2011, the disclosure of which is expressly incorporated by reference herein in its entirety.

BACKGROUND OF THE INVENTION

1. Field of the Invention

The present invention relates to a method for determining stabilization of a light output signal and a laser frequency stabilizing device.

2. Description of Related Art

Conventionally, a laser frequency stabilizing device is known in which laser light is irradiated on an absorption cell to obtain a light output signal. Then, based on a saturated absorption line contained in the light output signal, a resonator length is changed to stabilize the oscillation frequency of the laser light to a specific saturated absorption line (see, e.g., Japanese Patent Laid-open Publication No. 2008-141054).

Figure 4:
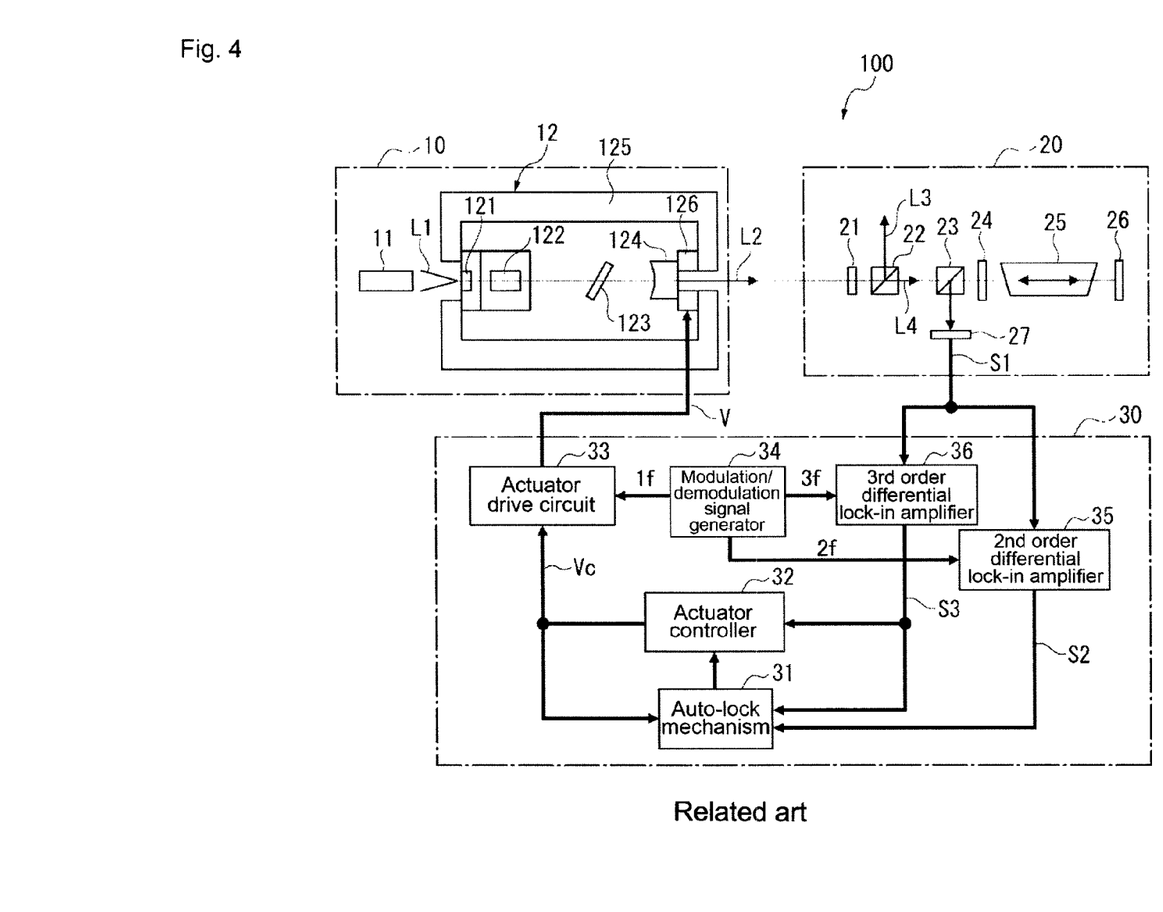
FIG. 4 is a block diagram illustrating a conventional laser frequency stabilizing device.

FIG. 4 is a block diagram illustrating a conventional laser frequency stabilizing device 100. As shown in FIG. 4, the laser frequency stabilizing device 100 includes a laser generator 10, a laser light detector 20, and a drive controller 30. The laser generator 10 includes an excitation semiconductor laser 11 emitting a laser light L1 at a wavelength of 808 nm and a resonant wave generator 12 inputting the laser light L1 and outputting a laser light L2 at a wavelength of 532 nm. The resonant wave generator 12 has a configuration in which optical elements such as an Nd:YVO4 crystal 121, a KTP crystal (nonlinear optical crystal) 122, an etalon 123, and a reflector 124 are accommodated in a resonator housing 125. The Nd:YVO4 crystal 121 produces a light having a wavelength of 1064 nm due to stimulated radiation. The KTP crystal 122 converts a portion of the 1064 nm wavelength light into a light having a wavelength of 532 nm. The etalon 123 allows only a specific frequency of laser light to pass therethrough. The reflector 124 reflects the 1064 nm wavelength light and allows the 532 nm wavelength light to pass therethrough. The single mode laser light L2 is obtained by disposing the etalon 123 within the resonator housing 125. In addition, an actuator 126 is disposed within the resonator housing 125. The actuator 126 may be a piezoelectric device that modifies a position of the reflector 124 (changes the resonator length) with an application of electric voltage.

In the laser light detector 20, the laser light L2 passes through a λ/2 plate 21 and is then split by a first polarization beam splitter 22 into a laser light L3 and a laser light L4. The laser light L3 is used for length measurement and the like, and the laser light L4 is used for a saturated absorption line search process (hereafter, search process) and a laser light oscillation frequency fixing process (hereafter, frequency fixing process), which will be described later. Moreover, in the laser light detector 20, the laser light L4 passes through a second polarization beam splitter 23, a λ/4 plate 24, and an iodine cell (absorption cell) 25. The laser light L4 is then reflected back toward the iodine cell 25 by a reflector 26. In addition, the laser light L4 once again passes through the iodine cell 25 and the λ/4 plate 24, and is then reflected by the second polarization beam splitter 23 toward a light detector 27, which is used as a converter. The laser light L4 then undergoes photoelectric conversion by the light detector 27 to output a light output signal S1.

Figure 5A:
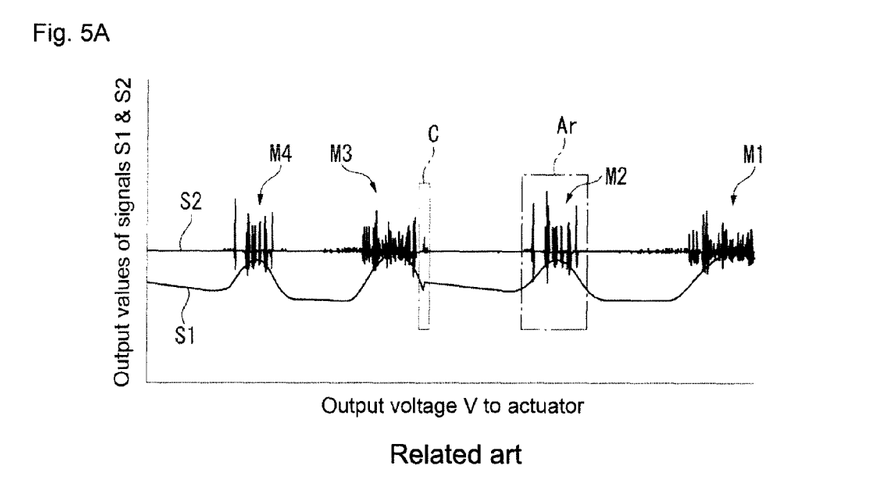
FIGS. 5A and 5B show a light output signal and a second order differential signal.
Figure 5B:
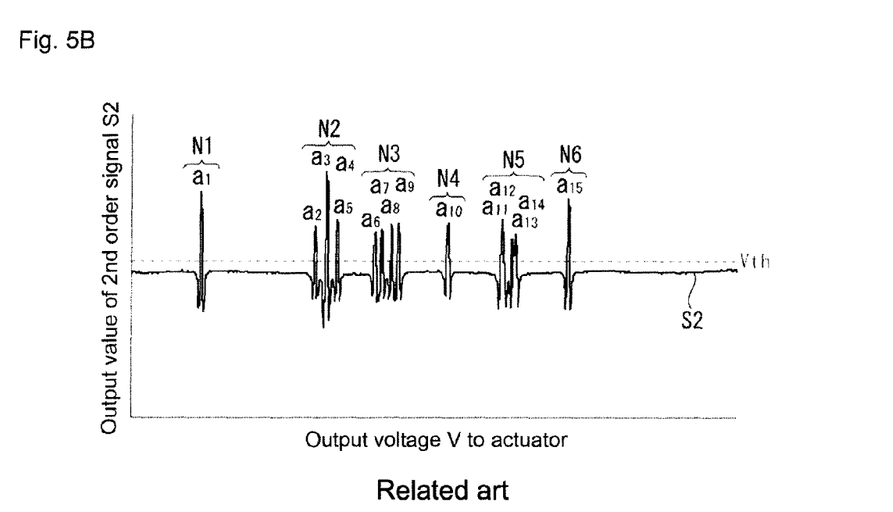

FIGS. 5A and 5B illustrate the light output signal S1 and a second order differential signal S2. FIG. 5A illustrates a waveform of each of the signals S1 and S2 in a case where an output voltage V is changed (the resonator length is changed) with output values for each of the signals S1 and S2 on the vertical axis and the output voltage V output to the actuator 126 on the horizontal axis. FIG. 5B illustrates a magnification of the second order differential signal S2 in a region Ar of FIG. 5A. As shown in FIG. 5A, when the output voltage V is scanned over a wide range, absorption lines M1 to M4 are observed to repeat periodically. Moreover, the absorption lines M1 and M3 are identical absorption lines and the absorption lines M2 and M4 are identical absorption lines. The absorption lines M1 to M4 are groups of saturated absorption lines that have been bundled. For example, as shown in FIG. 5B, the absorption line M2 is configured with, in order from lowest output voltage V, a saturated absorption line group N1 (saturated absorption line a1), a saturated absorption line group N2 (saturated absorption lines a2 to a5), a saturated absorption line group N3 (saturated absorption lines a6 to a9), a saturated absorption line group N4 (saturated absorption line a10), a saturated absorption line group N5 (saturated absorption lines a11 to a14), and a saturated absorption line group N6 (saturated absorption line a15).

The drive controller 30 controls an operation of the actuator 126 (adjusts the resonator length) and stabilizes the oscillation frequency to a specific saturated absorption line based on the light output signal S1. Specifically, in the drive controller 30, due to a control signal from an auto-lock mechanism 31, an actuator controller 32 controls an actuator drive circuit 33 (adjusts a voltage value Vc output to the actuator drive circuit 33), thereby modifying the output voltage V output to the actuator 126. In addition to the components 31 to 33 mentioned above, the drive controller 30 includes a modulation/demodulation signal generator 34, a second order differential lock-in amplifier 35, and a third order differential lock-in amplifier 36. The modulation/demodulation signal generator 34 outputs signals having frequencies of 1f, 2f, and 3f Hz. The laser light L2 is modified by the actuator drive circuit 33 based on the 1f Hz frequency signal, and the second order differential lock-in amplifier 35 and the third order differential lock-in amplifier 36 modulate the light output signal S1 obtained by excitation of the modified laser light L2 with the 2f Hz and 3f Hz frequencies, respectively, then output the second order differential signal S2 and a third order differential signal S3, respectively.

The auto-lock mechanism 31 measures saturated absorption lines one time in the search process (measures a number of absorption lines M1 to M4; a number of saturated absorption line groups belonging to each of the absorption lines M1 to M4; and a number of saturated absorption lines belonging to each saturated absorption line group), then measures the saturated absorption lines once again in the frequency fixing process to fix the oscillation frequency to a desired saturated absorption line. In the search process and the frequency fixing process, when an output value of the second order differential signal S2 is equal to or higher than a predetermined voltage value Vth (FIG. 5B) while varying the output voltage V, the auto-lock mechanism 31 recognizes the signal as a saturated absorption line.

SUMMARY OF THE INVENTION

Figure 6:
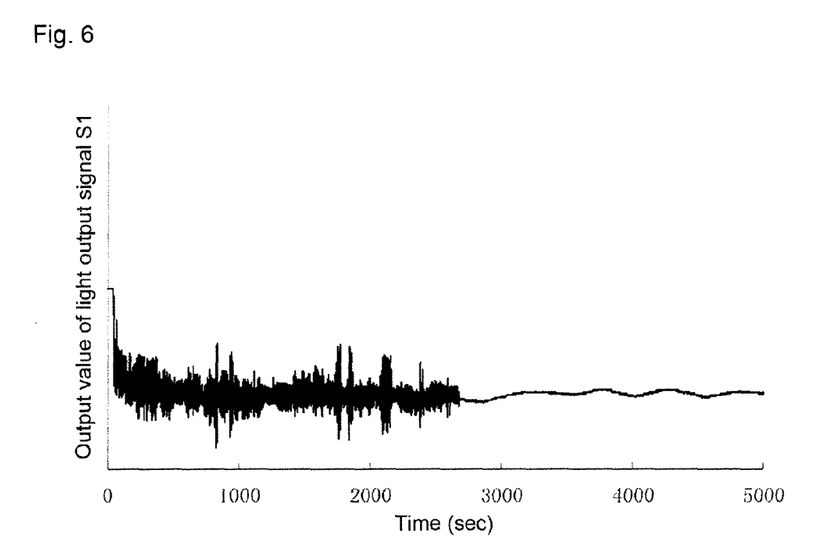
FIG. 6 shows the light output signal immediately after loading of a power source in the conventional laser frequency stabilizing device.

FIG. 6 shows a light output signal immediately after the conventional laser frequency stabilizing device 100 is powered on. Moreover, FIG. 6 shows a change over time of an output value of the light output signal S1 where the resonator length is set to a predetermined value, where the output value of the light output signal S1 is on the vertical axis and time elapsed after powering-on is on the horizontal axis. As shown in FIG. 6, the light output signal S1 continues to be unstable for some time (in FIG. 6, for 2700 seconds) after powering-on in the laser frequency stabilizing device 100, and thereafter stabilizes. In turn, the second order differential signal S2, in which the light output signal S1 is modulated by a 2f Hz frequency, similarly continues to be unstable for some time after powering-on, and thereafter stabilizes. That is, immediately after powering-on, the second order differential signal S2 is in an unstable state. Therefore, even when the search process and the frequency fixing process are run, saturated absorption lines cannot be accurately measured. For this reason, conventionally, a worker has begun use (the search process and the frequency fixing process) of the laser frequency stabilizing device 100 after a fixed amount of time has elapsed after powering-on (i.e., after waiting until the light output signal S1 (the second order differential signal) stabilizes). However, the worker has difficulty judging whether the light output signal S1 has actually stabilized. Thus, the light output signal S1 may still be in an unstable state at the time use of the laser frequency stabilizing device 100 begins, use of the laser frequency stabilizing device 100 may be delayed despite the light output signal S1 being stabilized, and the like, and so no improvement in convenience of the laser frequency stabilizing device 100 can be achieved.

The present invention provides a method for determining stabilization and a laser frequency stabilizing device that are able to automatically determine whether a light output signal is stabilized and that thus offer improved convenience.

The method for determining stabilization of the present invention is a method for determining stabilization of a light output signal employed by a laser frequency stabilizing device which irradiates laser light on an absorption cell to obtain the light output signal and then, based on a saturated absorption line contained in the light output signal, changes a resonator length to stabilize an oscillation frequency of the laser light to a specific saturated absorption line. The laser frequency stabilizing device includes a conversion mechanism converting the laser light that passes through the absorption cell into the light output signal, an actuator changing the resonator length, and a control mechanism controlling operation of the actuator. The control mechanism executes a signal analysis step and a stabilization determination step, the signal analysis step analyzing the light output signal converted by the conversion mechanism and the stabilization determination step determining whether the light output signal is stabilized based on an analysis result from the signal analysis step.

In the present invention, the method for determining stabilization includes the signal analysis step and the stabilization determination step described above, executed by the control mechanism which configures the laser frequency stabilizing device. The present invention can thereby automatically determine whether the light output signal is stabilized. Thus, after the light output signal is determined to be stabilized, the control mechanism can automatically advance, for example, to (1) a process alerting a worker that the laser frequency stabilizing device is ready for use (controlling illumination of an LED (Light Emitting Diode), controlling an audio notification, and the like), or (2) a search process and a frequency fixing process. Accordingly, the light output signal will not still be in an unstable state at the time use of the laser frequency stabilizing device begins, use of the laser frequency stabilizing device will not be delayed despite the light output signal being stabilized, and the like, so improvement in convenience of the laser frequency stabilizing device can be achieved.

In the method for determining stabilization of the present invention, the control mechanism preferably executes, when the light output signal is determined to not be stabilized in the stabilization determination step, a resonator length changing step controlling operation of the actuator to change the resonator length and then, after the resonator length changing step, executes the signal analysis step and the stabilization determination step once again.

A phenomenon called "mode hop" (see the mode hop C in FIG. 5A) occurs in which the oscillation frequency of the laser light rapidly changes depending on the resonator length. In addition, when the mode hop phenomenon is occurring at the resonator length that is set during detection of the light output signal, the light output signal is always in an unstable state. Specifically, when the mode hop phenomenon is occurring at the resonator length that is set during execution of the signal analysis step and the stabilization determination step, fundamentally (at resonator lengths where the mode hop phenomenon does not occur), regardless of whether the light output signal is stabilized and no matter how much time elapses, the light output signal can never be determined to be stabilized.

In the present invention, the method for determining stabilization includes the resonator length changing step described above, which is executed by the control mechanism. When the light output signal cannot be determined to be stabilized due to the occurrence of the mode hop phenomenon, the control mechanism can change the resonator length to a resonator length where the mode hop phenomenon does not occur, then once again execute the signal analysis step and the stabilization determination step. Thus, regardless of whether the light output signal is in an unstable state due to the occurrence of the mode hop phenomenon, the control mechanism is prevented from mistakenly determining that the laser frequency stabilizing device has malfunctioned.

In the method for determining stabilization of the present invention, the control mechanism preferably executes a tracking step tracking the time that has elapsed from a start point of the method for determining stabilization until the light output signal is determined to be stabilized in the stabilization determination step. The time that has elapsed from the start point of the method for determining stabilization (for example, time of powering-on) until the light output signal stabilizes is related to a degree of degradation of components (for example, an etalon) and the like in the laser frequency stabilizing device. In the present invention, the method for determining stabilization includes the tracking step described above executed by the control mechanism. Thus, a worker can efficiently recognize an occasion for maintenance, such as an occasion for replacing a component of the laser frequency stabilizing device by comprehending the time tracked in the tracking step.

The laser frequency stabilizing device of the present invention is a laser frequency stabilizing device which irradiates laser light on an absorption cell to obtain a light output signal and then, based on a saturated absorption line contained in the light output signal, changes a resonator length to stabilize an oscillation frequency of the laser light to a specific saturated absorption line. The laser frequency stabilizing device includes a conversion mechanism converting the laser light that passes through the absorption cell into the light output signal, an actuator changing the resonator length, and a control mechanism controlling operation of the actuator. The control mechanism includes a signal analyzer and a stabilization determiner, the signal analyzer analyzing the light output signal converted by the conversion mechanism and the stabilization determiner determining whether the light output signal is stabilized based on an analysis result from the signal analyzer. The laser frequency stabilizing device of the present invention is a device performing the method for determining stabilization that was described above, and thus can benefit from similar effects and results as the method for determining stabilization described above.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Hereafter, an embodiment of the present invention is described with reference to the drawings.

[Configuration of Laser Frequency Stabilizing Device]

Figure 1:
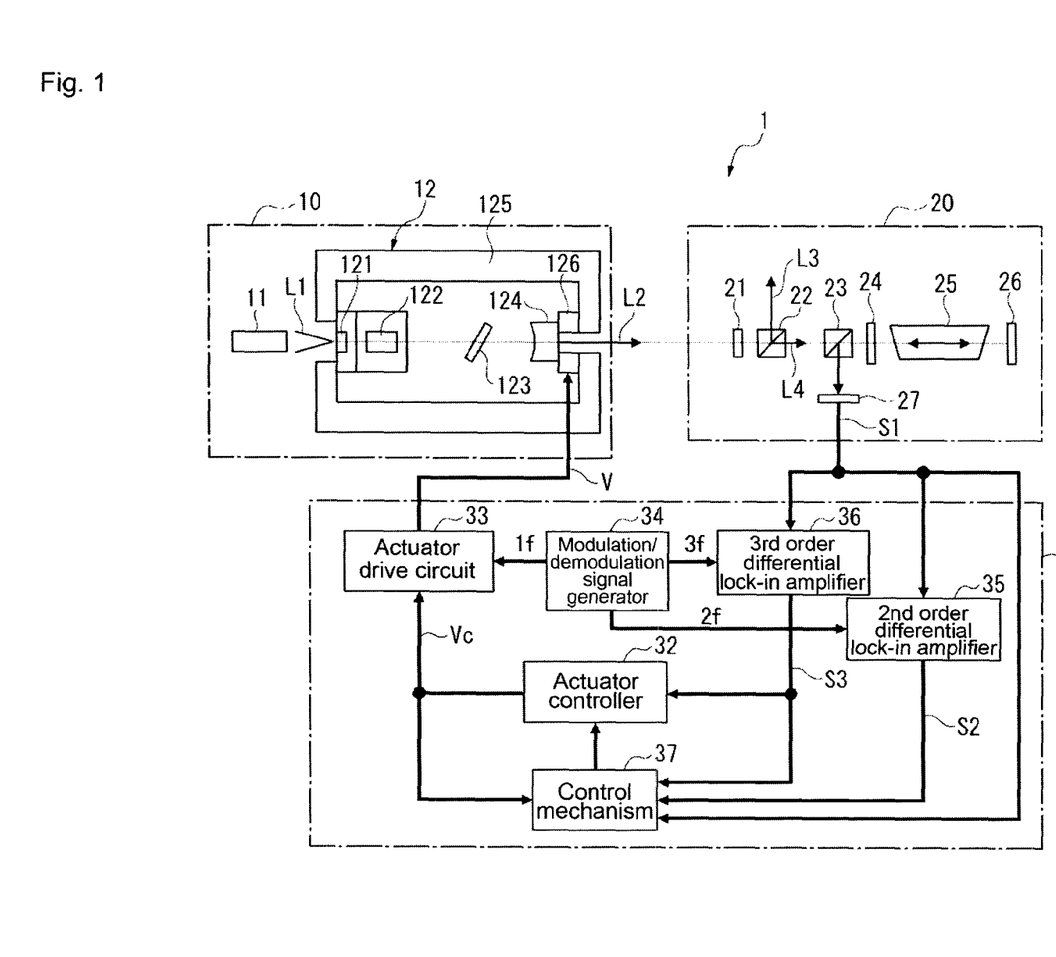
FIG. 1 is a block diagram illustrating a laser frequency stabilizing device according to an embodiment of the present invention.

FIG. 1 is a block diagram illustrating a laser frequency stabilizing device 1. As shown in FIG. 1, the laser frequency stabilizing device 1 includes a laser generator 10, a laser light detector 20, and a drive controller 30 similar to the conventional laser frequency stabilizing device 100. Compared to the conventional laser frequency stabilizing device 100, the laser frequency stabilizing device 1 of the present embodiment differs in executing a search process and a frequency stabilizing process, as well as in including a control mechanism (also referred to as a controller) 37 which acts to determine whether a light output signal S1 is stabilized. Therefore, hereafter those operations and structures which are similar to those of the conventional laser frequency stabilizing device 100 are given the same reference numerals and a description thereof is omitted. The control mechanism 37 which is a main component of the present invention is described in detail.

[Configuration of Control Mechanism]

Figure 2:
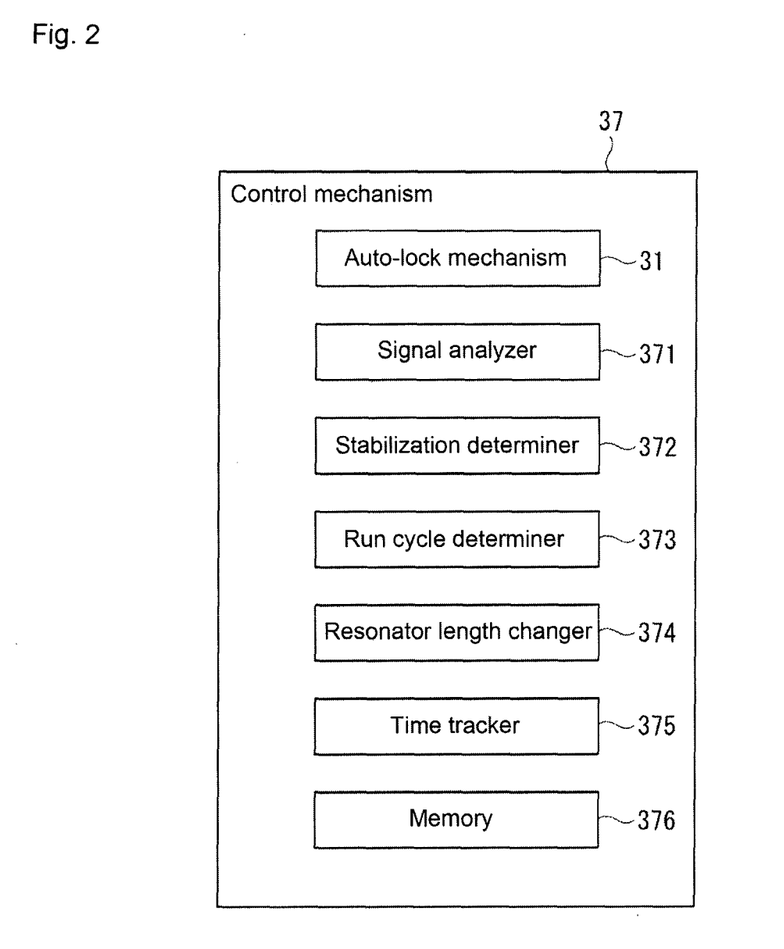
FIG. 2 is a block diagram illustrating a control mechanism according to the embodiment.

FIG. 2 is a block diagram illustrating the control mechanism 37. The control mechanism 37 includes a CPU (Central Processing Unit), a memory 376, and the like, and executes a variety of processes in accordance with programs stored in the memory 376. As shown in FIGS. 1 and 2, the control mechanism 37 includes an auto-lock mechanism 31 similar to that of the conventional laser frequency stabilizing device 100, and also includes a signal analyzer 371, a stabilization determiner 372, a run cycle determiner 373, a resonator length changer 374, a time tracker 375, the memory 376, and the like.

The signal analyzer 371 inputs the light output signal S1 from a light detector 27, then analyzes the light output signal S1. Based on an analysis result from the signal analyzer 371, the stabilization determiner 372 determines whether the light output signal S1 is stabilized. The run cycle determiner 373 tracks the run cycles of processes performed by the signal analyzer 371 and the stabilization determiner 372, as well as the run cycles of a process performed by the resonator length changer 374, then determines whether each of the tracked run cycles exceeds a predetermined number of cycles.

The resonator length changer 374 controls operation of an actuator drive circuit 33 (adjusts a voltage V applied to an actuator 126) to change the resonator length. The time tracker 375 tracks the amount of time from loading of a power source until the light output signal S1 is determined to be stabilized by the stabilization determiner 372.

[Method for Determining Stabilization]

Figure 3:
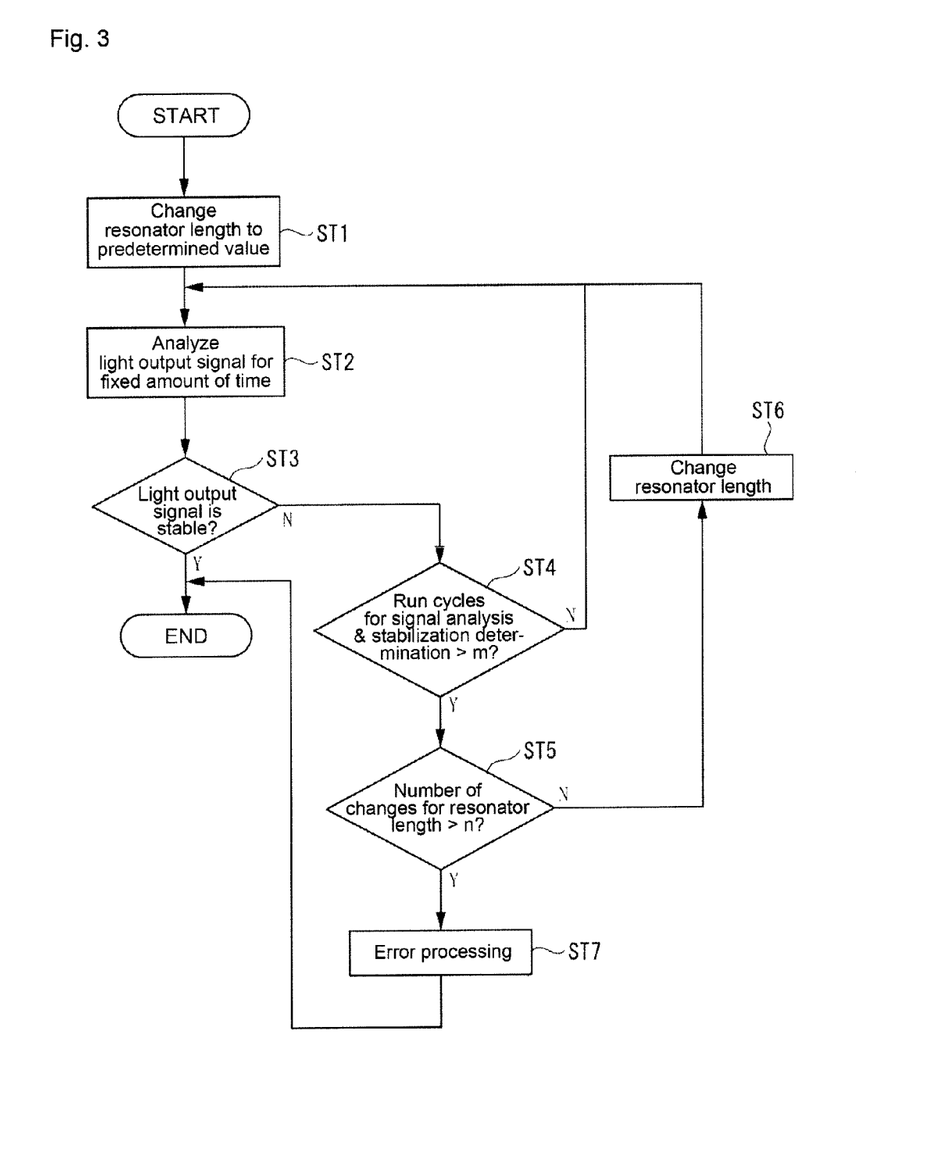
FIG. 3 is a flowchart describing a method for determining stabilization according to the embodiment.

FIG. 3 is a flowchart describing a method for determining stabilization. Next, the method for determining stabilization with the control mechanism 37 will be described. When the power source is loaded in the laser frequency stabilizing device 1, the control mechanism 37 executes the method for determining stabilization illustrated below. First, the resonator length changer 374 controls the operation of the actuator drive circuit 33 to change the resonator length to a predetermined value (step ST1).

Next, the signal analyzer 371 analyzes the light output signal S1 for a fixed amount of time (step ST2: signal analysis step). Specifically, the signal analyzer 371 stores output values of the light output signal S1 output from the light detector 27 in the memory 376 in order at predetermined sampling intervals. After the fixed amount of time has elapsed, the signal analyzer 371 reads the output values of the light output signal S1 stored in the memory 376 and calculates a standard deviation thereof. The fixed amount of time mentioned above is an amount of time sufficiently shorter than an amount of time that the typical laser frequency stabilizing device 1 is expected to take from powering-on until the light output signal S1 stabilizes.

After step S2, the stabilization determiner 372 compares the standard deviation calculated by the signal analyzer 371 with a predetermined threshold value, then determines whether the standard deviation is less than the predetermined threshold value (i.e., whether the light output signal S1 is stabilized) (step ST3: stabilization determination step). In step ST3, when the stabilization determiner 372 reaches a "Y" determination, the control mechanism 37 ends execution of the method for determining stabilization.

Meanwhile, when the stabilization determiner 372 reaches an "N" determination in step ST3, the run cycle determiner 373 determines whether the tracked run cycles of the processes performed by the signal analyzer 371 and the stabilization determiner 372 (the run cycles of the signal analysis step ST2 and the stabilization determination step ST3) exceed a predetermined number of cycles m (step ST4). The number of cycles m is a number of cycles approximating a number where the expected stabilization time is divided by the fixed amount of time. That is, the expected stabilization time is an amount of time taken from powering-on until the light output signal S1 generally stabilizes and, until the expected stabilization time elapses, step ST4 determines whether the signal analysis step ST2 and the stabilization determination step ST3 have been repeatedly executed. In step ST4, when the run cycle determiner 373 reaches an "N" determination, the control mechanism 37 repeatedly executes the signal analysis step ST2 and the stabilization determination step ST3 until the run cycle determiner 373 reaches a "Y" determination.

Meanwhile, when a "Y" determination is reached in step ST4, the run cycle determiner 373 determines whether the tracked run cycles of the process performed by the resonator length changer 374 (the run cycles of step S6, described below) exceed a predetermined number of cycles n (step ST5). In step ST5, when the run cycle determiner 373 reaches an "N" determination, the resonator length changer 374 controls the operation of the actuator drive circuit 33 to change the resonator length (step ST6: resonator length changing step).

Based on the light output signal S1 output from the light detector 27 at the resonator length that is changed in the resonator length changing step ST6, the control mechanism 37 repeatedly performs the processes of steps ST2 to ST4 until the light output signal S1 is determined to be stabilized. In a case where the light output signal S1 is not determined to be stabilized even when the control mechanism 37 repeatedly performs the processes of steps ST2 to ST4, the resonator length changing step ST6 is performed once again, and then the processes of steps ST2 to ST4 are repeatedly performed.

In a case where a "Y" determination is reached in step ST5 as a result of repeatedly performing the processes of steps ST2 to ST6, the control mechanism 37 executes an error process (step ST7) and ends execution of the method for determining stabilization. An example of an error process includes a process to notify the worker that the laser frequency stabilizing device 1 is malfunctioning by controlling illumination of an LED and the like, or by controlling an audio notification.

Furthermore, as described below, although omitted from FIG. 3, the time tracker 375 tracks time while the method for determining stabilization is being performed (tracking step). The time tracker 375 tracks the time from powering-on (start time of the method for determining stabilization) until the light output signal S1 is determined to be stabilized in the processes of steps ST1 to ST4. The time tracker 375 stores the tracked time in the memory 376. Moreover, when any of the processes of steps ST5 to ST7 is executed in the method for determining stabilization described above, the time tracker 375 resets the tracked time and does not store the tracked time in the memory 376.

The present embodiment as described above has the following effect. In the present embodiment, the method for determining stabilization includes the signal analysis step ST2 and the stabilization determination step ST3, which are executed by the control mechanism 37. The present embodiment can thus automatically determine whether the light output signal S1 is stabilized. Therefore, after determining that the light output signal S1 is stabilized, the control mechanism 37 automatically advances to either (1) a process alerting the worker that the laser frequency stabilizing device 1 is ready for use (controlling illumination of an LED or the like, controlling an audio notification, and the like), or (2) the search process and the frequency fixing process. Accordingly, the light output signal S1 will not still be in an unstable state at the time use of the laser frequency stabilizing device 1 begins, use of the laser frequency stabilizing device 1 will not be delayed despite the light output signal S1 being stabilized, and the like, and so convenience of the laser frequency stabilizing device 1 can be improved for the worker.

The method for determining stabilization also includes the resonator length changing step ST6 executed by the control mechanism 37. Thus, in a case where stabilization of the light output signal S1 cannot be determined due to an occurrence of a mode hop phenomenon, the control mechanism 37 can change the resonator length to a resonator length at which the mode hop phenomenon does not occur, then execute the signal analysis step ST2 and the stabilization determination step ST3 once again. Accordingly, despite the light output signal S1 being unstable due to the occurrence of the mode hop phenomenon, the control mechanism 37 can be prevented from mistakenly determining that the laser frequency stabilizing device 1 is malfunctioning.

Moreover, the method for determining stabilization includes the tracking step executed by the control mechanism 37. Thus, by comprehending a time stored in the memory 376 in the tracking step, the worker can efficiently recognize an occasion for maintenance, such as an occasion for replacing components of the laser frequency stabilizing device 1 (for example, the etalon 123).

Furthermore, the present invention is not limited to the above-described embodiment, and is inclusive of modifications, improvements, and the like capable of achieving the present invention. In the embodiment described above, stabilization of the light output signal S1 is determined in the signal analysis step ST2 and the stabilization determination step ST3 based on the standard deviation of detected output values for the light output signal S1 over a fixed period of time. However, the present invention is not limited to this. For example, a method may be employed in which the output values of the light output signal S1 are compared to a predetermined threshold value, then stabilization of the light output signal S1 is determined based on a result of the comparison. In other words, any method may be employed in which the light output signal S1 is analyzed, then stabilization of the light output signal S1 is determined based on a result of the analysis.

The present invention can be used in a laser frequency stabilizing device in which laser light is irradiated on an absorption cell to obtain a light output signal and then, based on a saturated absorption line contained in the light output signal, a resonator length is changed to stabilize the oscillation frequency of the laser light to a specific saturated absorption line.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A method for determining stabilization of a light output signal employed by a laser frequency stabilizer which irradiates laser light on an absorption cell to obtain the light output signal and, based on a saturated absorption line contained in the light output signal, changes a resonator length to stabilize an oscillation frequency of the laser light to a specific saturated absorption line,
wherein the laser frequency stabilizer comprises:
a converter converting the laser light that passes through the absorption cell into the light output signal,
an actuator changing the resonator length, and
a controller controlling operation of the actuator, and
wherein the controller:
receives the light output signal, a second order differential signal of the light output signal, and a third order differential signal of the light output signal,
executes signal analysis by analyzing the light output signal converted by the converter, and
executes stabilization determination by determining whether the light output signal is stabilized based on an analysis result from the signal analysis.

2. The method for determining stabilization according to claim 1, further comprising:
the controller executing, when the light output signal is determined to not be stabilized in the stabilization determination, a resonator length changing procedure controlling operation of the actuator to change the resonator length, and
the controller again executing the signal analysis and the stabilization determination after the resonator length changing procedure.

3. The method for determining stabilization according to claim 1, further comprising:
tracking, by the controller, the time from a start point of the method for determining stabilization until the light output signal is determined to be stabilized in the stabilization determination.

4. The method for determining stabilization according to claim 2, further comprising:
tracking, by the controller, the time from a start point of the method for determining stabilization until the light output signal is determined to be stabilized in the stabilization determination.

5. The method for determining stabilization according to claim 1,
wherein the signal analysis includes analyzing the light output signal for a fixed amount of time using predetermined sampling intervals and storing analysis output values.

6. The method for determining stabilization according to claim 5,
wherein the signal analysis includes retrieving the stored analysis output values and calculating a standard deviation of the stored analysis output values.

7. The method for determining stabilization according to claim 5,
wherein the fixed amount of time is shorter than an amount of time that the laser frequency stabilizer takes from powering-on until the light output signal stabilizes.

8. The method for determining stabilization according to claim 6,
wherein the stabilization determination includes comparing the standard deviation of the stored analysis output values with a predetermined threshold value.

9. The method for determining stabilization according to claim 8,
wherein the stabilization determination includes ending the stabilization determination when the stabilization determination determines that the standard deviation is less than the predetermined threshold value.

10. A laser frequency stabilizer configured to irradiate laser light on an absorption cell to obtain a light output signal and, based on a saturated absorption line contained in the light output signal, change a resonator length to stabilize an oscillation frequency of the laser light to a specific saturated absorption line, the laser frequency stabilizer comprising:
a converter configured to convert the laser light that passes through the absorption cell into the light output signal,
an actuator configured to change the resonator length, and
a controller configured to receive the light output signal, a second order differential signal of the light output signal, and a third order differential signal of the light output signal, and to control operation of the actuator, the controller comprising:
a signal analyzer configured to analyze the light output signal converted by the conversion mechanism; and
a stabilization determiner configured to determine whether the light output signal is stabilized, based on an analysis result from the signal analyzer.

11. The laser frequency stabilizer according to claim 10,
wherein the signal analyzer analyzes the light output signal for a fixed amount of time and calculates a standard deviation based on the analyzed light output signal.

12. The laser frequency stabilizer according to claim 11,
wherein the stabilization determiner compares the standard deviation with a predetermined threshold value, and ends stabilization determination when the stabilization determiner determines that the standard deviation is less than the predetermined threshold value.

13. A method for determining stabilization of a light output signal employed by a laser frequency stabilizer which irradiates laser light on an absorption cell to obtain the light output signal and, based on a saturated absorption line contained in the light output signal, changes a resonator length to stabilize an oscillation frequency of the laser light to a specific saturated absorption line, the method comprising:
converting, by a converter, the laser light that passes through the absorption cell into the light output signal;
changing, by an actuator, the resonator length;
receiving, by a controller, the light output signal, a second order differential signal of the light output signal, and a third order differential signal of the light output signal,
analyzing, by the controller, the light output signal of the converted laser light; and
determining, by the controller, whether the light output signal is stabilized based on an analysis result from said analyzing the light output signal.

14. The method for determining stabilization according to claim 13,
wherein said changing the resonator length further comprises changing the resonator length when the light output signal is determined to not be stabilized in said determining whether the light output signal is stabilized, the method further comprising again performing, after said changing the resonator length, said analyzing the light output signal and said determining whether the light output signal is stabilized.

15. The method for determining stabilization according to claim 13, further comprising:
   tracking the time from a start point of the method for determining stabilization until the light output signal is determined to be stabilized in said determining whether the light output signal is stabilized.

16. The method for determining stabilization according to claim 14, further comprising:
   tracking the time from a start point of the method for determining stabilization until the light output signal is determined to be stabilized in said determining whether the light output signal is stabilized.

17. The method for determining stabilization according to claim 13,
   wherein the analyzing by the controller includes analyzing the light output signal for a fixed amount of time using predetermined sampling intervals and storing analysis output values.

18. The method for determining stabilization according to claim 17,
   wherein the analyzing by the controller includes retrieving the stored analysis output values and calculating a standard deviation of the stored analysis output values.

19. The method for determining stabilization according to claim 18,
   wherein the determining by the controller includes comparing the standard deviation of the stored analysis output values with a predetermined threshold value.

20. The method for determining stabilization according to claim 19,
   wherein the determining by the controller includes ending stabilization determination when the controller determines that the standard deviation is less than the predetermined threshold value.

\* \* \* \* \*